United States Patent [19]

Mueller

[11] Patent Number: 4,815,699

[45] Date of Patent: Mar. 28, 1989

[54] VALVE WITH RESILIENT, BELLOWS MOUNTED VALVE SEAT

[75] Inventor: Brad Mueller, San Diego, Calif.

[73] Assignee: Sundstrand Corporation, Rockford, Ill.

[21] Appl. No.: 135,978

[22] Filed: Dec. 21, 1987

[51] Int. Cl.$^4$ .................... F16K 31/04; F16K 1/42
[52] U.S. Cl. .................... 251/129.11; 251/170; 251/174; 251/333; 251/335.3
[58] Field of Search .......... 251/359, 360, 84, 174, 251/170, 176, 364, 334, 333, 335.3

[56] References Cited

U.S. PATENT DOCUMENTS

| 3,550,903 | 12/1970 | Hauser | 251/334 X |
| 3,646,969 | 3/1972 | Stampfli | 251/174 X |
| 4,064,904 | 12/1977 | Tolnai | 251/333 X |

FOREIGN PATENT DOCUMENTS

| 514883 | 7/1955 | Canada | 251/333 |
| 2140061 | 2/1973 | Fed. Rep. of Germany | 251/334 |
| 237464 | 8/1945 | Switzerland | 251/333 |

Primary Examiner—Arnold Rosenthal
Attorney, Agent, or Firm—Wood, Dalton, Phillips, Mason & Rowe

[57] ABSTRACT

A rapid response poppet valve includes a valve body 10 with an internal cavity 16 in which a valve seat 100 is located. A poppet 70 is mounted for movement toward and away from the valve seat 100 and the valve seat 100 is resiliently biased toward the poppet 70 by a bellows 114 to resiliently mount the seat 100 and additionally seal the seat 100 to the valve body 10.

8 Claims, 1 Drawing Sheet

VALVE WITH RESILIENT, BELLOWS MOUNTED VALVE SEAT

FIELD OF THE INVENTION

This invention relates to valves, and more particularly, to a poppet valve construction provided with a resiliently mounted valve seat.

BACKGROUND OF THE INVENTION

Poppet valves have found substantial use in a large variety of applications. In a typical poppet valve, a poppet is reciprocated toward or away from a valve seat against which it may seal to halt the flow of fluid or be spaced from the valve seat to permit the flow of fluid. While in most instances, the valve seat is rigidly mounted within a body housing both the seat and the poppet, in some instances it may be desirable to resiliently mount the valve seat or even provide a resilient valve seat. In a number of instances this is intended to enhance sealing, typically by allowing the sealing surface of the valve seat to adjust for radial, axial, and angular mismatches in the alignment of the sealing surface on the poppet and the sealing surface on the valve seats.

In other instances, resilient mounting of the valve seat may be to accommodate the possible presence of solid material carried in a slurry or the like that happens to be interposed between the sealing surfaces on the poppet and on the valve seat when the latter is to be closed against the former.

Illustrative of constructions used for the foregoing are U.S. Pat. No. 3,870,071 issued Mar. 11, 1975 to Graham et al and U.S. Pat. No. 4,505,292 issued Mar. 19, 1985 to Osterode, respectively.

In addition, the resilient mounting of the valve seat provides some cushioning action as the valve is closed thereby reducing wear and promoting longer life of the sealing components. This feature in valves of this type is recognized in U.S. Pat. No. 2,840,336 issued June 24, 1958 to Suthann.

SUMMARY OF THE INVENTION

It is the principal object of the invention to provide a new and improved poppet valve of the type provided with a resiliently mounted valve seat.

According to the invention there is provided a valve with a valve housing including an inlet, and outlet and an interior cavity extending between the inlet and the outlet. A valve seat is disposed within the housing and in the cavity between the inlet and the outlet. A poppet is also located within the cavity. Means are provided for mounting the poppet for movement toward and away from the valve seat so that the poppet may seat against or be spaced from the valve seat and a resilient bellows is employed to mount the valve seat within the cavity. The bellows has a first end sealed to the valve seat, an opposed end sealed to the housing and a hollow interior defining a flow path from one of the inlet and the outlet to the valve seat.

As a consequence of the foregoing construction, the valve seat is resiliently mounted by the bellows to be shiftable within the cavity to achieve alignment with the poppet when engaged thereby. It will be appreciated that the use of a bellows achieves both a sealing and a biasing function in the inventive construction and provides good compensation for all forms of misalignment, namely radial misalignment, angular misalignment, and particularly, axial misalignment. Thus, the valve is ideally suited for use in valves having high torque actuators because of the excellent cushioning in the axial direction provided by the bellows, which minimizes wear.

In a preferred embodiment of the invention, the valve is adapted to have its inlet connected to a source of higher pressure fluid and the bellows is located on the inlet side of the seat with the poppet being located on the outlet side of the seat. As a result, the pressurized fluid acting against the interior of the bellows assists in biasing the seat toward the poppet to assure a good seal.

In a preferred embodiment of the invention, the end of the bellows opposite that mounting the seat terminates in a rigid ring-like base. The base is provided with a radially outwardly opening groove and an O-ring seal is disposed in the groove to sealingly engage against the housing.

Preferably, the cavity within the housing includes two steps of progressively reduced diameter and the bellows biases the valve seat against the second one of the steps. The ring-like base is held in place against the first of the steps and the O-ring seal is disposed between the steps in engagement with the cavity wall. Thus, the second step serves as a stop for limiting movement of the valve seat toward the poppet under the bias of the bellows and/or pressurized fluid at the inlet.

The invention contemplates the provision of a motor and drive housing secured to the valve housing, which motor and drive housing is provided with a bore opening toward the seat. A plunger is reciprocable within that bore and the poppet is mounted on the plunger. A rotary shaft and a drive motor therefore is located in the motor and drive housing and a rotary to reciprocating motion converting mechanism interconnects the shaft and the plunger.

The invention further contemplates the provision of an additional bellows sealed at its opposite ends respectively to the plunger and to the cavity.

Other objects and advantages will become apparent from the following specification taken in connection with the accompanying drawings.

DESCRIPTION OF THE PREFERRED EMBODIMENT

Figure 1:
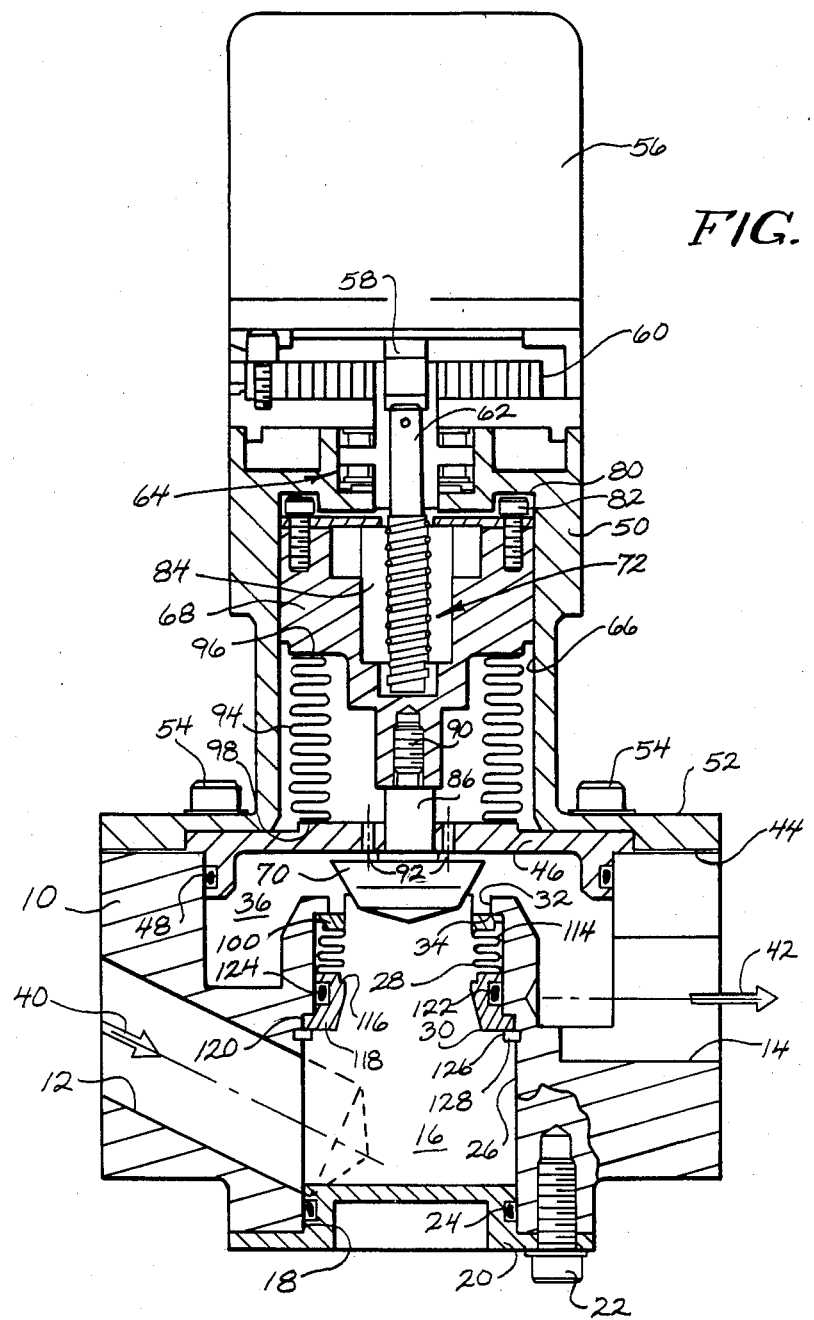
FIG. 1 is a sectional view of a valve made according to the invention.

An exemplary embodiment of the invention is illustrated in the drawings and with reference to FIG. 1 is seen to include a valve body 10 having a bore 12 which serves as an inlet for connection to a source of relatively higher pressure fluid and an outlet port 14. Intermediate the inlet 12 and the outlet port 14 is a cavity 16 which extends to an open end 18 in the housing 10. The open end 18 can be closed by a cap 20 which is removable from the body 10 but will normally be held in place by a plurality of retaining screws 22 (only one of which is shown). To seal the cavity 16, the cap 20 is provided with a peripheral O-ring seal 24 to engage the periphery of the cavity 16 just inwardly of the end 18.

The cavity 16 will typically be cylindrical in configuration, having a large diameter section 26 separated from an intermediate diameter section 28 by a first step 30 which in turn is separated from a small diameter section 32 by a second step 34. The small diameter section 32 opens to an annular section 36 of the cavity 16 which in turn is in fluid communication with the outlet port 14.

Thus, a path of fluid flow through the valve in the direction of arrows 40 and 42 and is established via the inlet 12, the cavity 16 and the parts thereof, and the outlet port 14.

To form the annular section 36 of the cavity 16, the upper ed 44 of the body 10 is open and this in turn requires the provision of a supporting web 46 in the resulting opening. A peripheral seal 48 is associated with the supporting web 46 and the latter is held in place by being sandwiched between the valve housing 10 and a motor and drive housing 50 having a flange 52. The motor and drive housing 50 is secured to the valve housing 10 by means of threaded fasteners 54 extending through the flange 52 and includes, at its upper end, a high speed stepper motor 56 having a rotary output shaft 58 in engagement with a drive spring 60 which is used to return the poppet to a known stop position in the event of loss of electrical power to the motor 56. The output shaft 58 and the drive spring 60 are coupled by any suitable means to a rotary shaft 62 within the housing 50 and the shaft 62 journaled by thrust bearings, generally designated 64.

The shaft 62 extends into a cavity or bore 66 within the housing 50 in which a plunger 68 is reciprocally mounted. The plunger 68, at its lower end, and within the cavity 16, mounts a frustoconical poppet 70. A conventional ball nut assembly, generally designated 72, interconnects the plunger 68 and the rotary shaft 62 thereby serving as a rotary to reciprocating motion converting mechanism. Stated another way, dependent upon the direction of rotation of the output shaft 58 of the stepper motor 56, the plunger 68 will be reciprocated within the cavity 66 to drive the poppet 70 more deeply into the cavity 16 or to retract the poppet 70 therefrom.

To prevent relative movement between the ball nut assembly 72 and the plunger 68, a retaining plate 80 held in place by threaded fasteners 82 captivates the ball nut assembly 72 within a bore 84 in the plunger 68.

The poppet 70 includes a stem 86 which extends through an opening 88 in the supporting web 46 to be threaded to the plunger as at 90. The plunger 68 and/or the stem 86 may be keyed by means not shown to the housing 50 or the supporting web 46 to prevent relative rotation with respect thereto. Vent openings 92 may establish fluid communication through the supporting web 46 so that fluid will not be compressed as the plunger 68 moves downwardly within the bore 66, to avoid creating resistance to such movement.

At the same time, to avoid leakage from the cavity 16 through the motor and drive housing 50, a bellows 94 is disposed within the bore 66. The upper end 96 of the bellows 94 is in sealing engagement with the underside of the plunger 68 while the opposite end 98 of the bellows 94 is in sealing engagement with the supporting web 46 radially outward of the vent openings 92.

Figure 2:
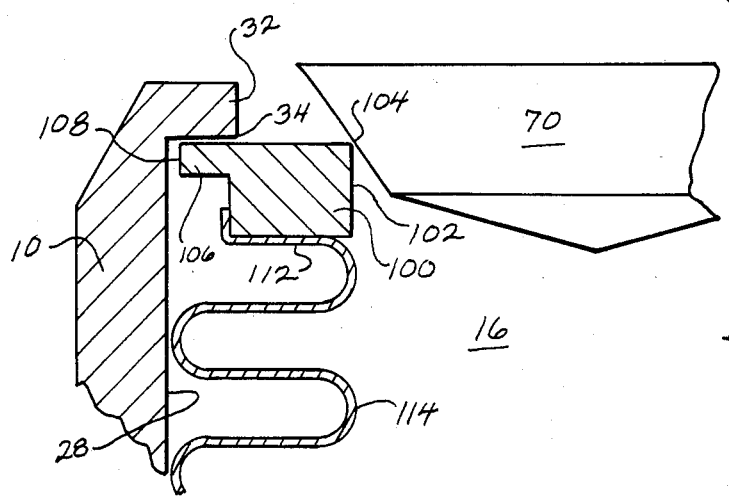
FIG. 2 is an enlarged, fragmentary sectional view of the poppet, valve seat and bellows employed in the invention.

Located within the cavity 16 on the inlet side of the small diameter section 32 is a ring-like valve seat 100. As best seen in FIG. 2, the valve seat 100 has an inner diameter 102 that is intermediate the diameters of the major and minor bases of the frustocone defining the frustoconical valve member 70. As a consequence, a circular line of sealing contact may exist at the location 104.

The valve seat 100, at its radially outer extremity, has an annular, radially outward directed flange 106 of reduced axial length from that of the majority of the valve seat 100. The outer diameter is shown at 108 and it will be appreciated from FIG. 2 that such outer diameter is less than diameter of the intermediate diameter section 28 of the cavity 16. As a consequence, a small space 110 exists peripherally about the valve seat 100.

The valve seat 100 is mounted on one end 112 of a resilient metallic bellows 114. The bellows 114 is of conventional construction, being generally cylindrical and having a corrugated exterior designed by a plurality of aligned folds as is apparent from the drawings.

The opposite end 116 of the bellows terminates in a rigid ring-like mounting base 118. The mounting base 118 includes an annular flange 120 which limits movement of the base 118 into the cavity 116 by engagement with the first step 30. The ring-like mounting base 118 also includes an annular, radially outwardly opening groove 122 which receives an O-ring seal 124 for sealing engagement against the intermediate diameter section 28 of the cavity 16.

A snap ring 126 may be disposed in a groove 128 located within the large diameter section 26 to hold the ring-like base 118 in place.

It will be observed that by removal of the snap retainer 126 as well as the cap 20, the valve seat 100, the bellows 114 and the ring-like base 116 along with the O-ring seal 124 can be removed through the opening 18 as a module.

As a result of the foregoing construction, the valve seat 100 is biased by the bellows 114 against the step 34 which serves as a stop, limiting movement of the valve seat 100 toward the valve 70. At the same time, it will be appreciated that the valve seat 100 may move away from the step 34 an appreciable distance against the bias of the bellows 114 when engaged by the poppet 70 to compensate for a substantial degree of axial misalignment. In this regard, it is preferable that the bellows 114 have a relatively low spring rate.

At the same time, it will be appreciated that by reason of the peripheral gap 110, the valve seat 100 may cant within the intermediate diameter section 28 of the cavity 16 or move from side to side therein; or combinations of both. Canting action of the valve seat 100 compensates for angular misalignment between the poppet 70 and the valve seat 100 while side to side movement of the valve seat 100 compensates for radial misalignment of the poppet 70 and the valve seat 100.

It should be noted that even though the bellows 114 is chosen to have a low spring rate, positive sealing at the line of contact 104 between the valves seat 100 and the poppet 70 occurs by reason of the location of the bellows 114 on the inlet side of the valve seat 100. In particular, the relatively higher pressure of the fluid at the inlet side will act against the interior of the bellows tending to expand the same thus providing an additional biasing force for biasing the valve seat 100 toward the poppet 70.

A valve made according to the invention will find many uses in those applications where a resiliently mounted valve seat is desirable. A highly preferred use is in a refrigeration system where the valve is employed to bypass a compressor with the inlet 12 connected to the discharge side of the compressor and the outlet port 114 in fluid communication with the suction side of the compressor.

In many such systems, it is required that an adequate flow of refrigerant gas be maintained through the compressor, regardless of the cooling flow requirements of the system, to prevent compressor damage due to surging, particularly when high speed centrifugal compressors are utilized. Through conventional control systems, the stepper motor 56 of the present valve may be operated to rapidly move the poppet 70 away from the seat 100 to allow compressed refrigerant at the discharge side of the compressor to back flow to the suction side to provide the necessary refrigerant gas flow to prevent damage to the compressor. The stepper valve 56 can also be utilized to move the poppet 70 to suitable intermediate, modulating positions so that the bypassing of refrigerant back to the suction side of the compressor provides only the necessary quantity of refrigerant. However, in any such use, it will be recognized that a fast response is required which in turn will cause relatively large forces to be present when the poppet 70 contacts the valve seat 100. However, these forces are taken up without causing accelerated wear by the unique mounting of the valve seat 100 by the bellows 114 all the while assuring positive sealing and compensation for misalignment caused either by wear or by manufacturing tolerances.

Thus, a trouble free valve capable of providing rapid response and having long life characteristics and further being of modular construction is provided by the invention.

I claim:
1. A valve comprising:
  a valve housing including an inlet, an outlet and an interior cavity extending between said inlet and said outlet;
  a valve seat within said housing and in said cavity between said inlet and said outlet;
  a poppet within said cavity;
  means mounting said poppet for movement toward and away from said valve seat so that said poppet may seat against or be spaced from said valve seat;
  a resilient bellows mounting said valve seat within said cavity, said bellows having a first end sealed to said valve seat, an opposed end sealed to said housing and a hollow interior defining a flow path from one of said inlet and said outlet to said valve seat, said opposed end terminating in a ring-like base;
  a radially outwardly opening groove in said base; and
  an O-ring seal in said groove and sealingly engaging said housing;
  whereby said valve seat is resiliently mounted by said bellows to be shiftable within said cavity to achieve alignment with said poppet when engaged thereby.

2. The valve of claim 1 wherein said valve is adapted to have said inlet connected to a source of higher pressure fluid and said bellows is located on the inlet side of said seat and said poppet is located on the outlet side of said seat.

3. A valve comprising:
  a valve housing including an inlet, an outlet and an interior cavity extending between said inlet and said outlet;
  a valve seat within said housing and in said cavity between said inlet and said outlet;
  a poppet within said cavity;
  means mounting said poppet for movement toward and away from said valve seat so that said poppet may seat against or be spaced from said valve seat;
  a resilient bellows mounting said valve seat within said cavity, said bellows having a first end sealed to said valve seat, an opposed end sealed to said housing and a hollow interior defining a flow path from one of said inlet and said outlet to said valve seat;
  said poppet being frustoconical and said bellows biasing said seat toward said poppet; and
  stop means for limiting movement of said seat toward said poppet;
  whereby said valve seat is resiliently mounted by said bellows to be shiftable within said cavity to achieve alignment with said poppet when engaged thereby.

4. The valve of claim 1 further including a motor and drive housing secured to said valve housing and having a bore opening toward said seat, a plunger reciprocal within said bore, said poppet being mounted on said plunger, a rotary shaft and a drive motor therefor in said motor and drive housing, and a rotary to reciprocating motion converting mechanism interconnecting said shaft and said plunger.

5. A valve comprising:
  a valve housing including an inlet, an outlet and an interior cavity extending between said inlet and said outlet;
  a valve seat within said housing an in said cavity between said inlet and said outlet;
  a poppet within said cavity;
  means mounting said poppet for movement toward and away from said valve seat so that said poppet may seat against or be spaced from said valve seat;
  a resilient bellows mounting said valve seat within said cavity, said bellows having a first end sealed to said valve seat, an opposed end sealed to said housing and a hollow interior defining a flow path from one of said inlet and said outlet to said valve seat;
  a motor and drive housing secured to said valve housing and having a bore opening toward said seat;
  a plunger reciprocal within said bore;
  said poppet being mounted on said plunger;
  a rotary shaft and a drive motor therefore in said motor and drive housing;
  a rotary to reciprocating motion converting mechanism interconnecting said shaft and said plunger; and
  an additional bellows sealed at its opposite ends respectively to said plunger and to said cavity;
  whereby said valve seat is resiliently mounted by said bellows to be shiftable within said cavity to achieve alignment with said poppet when engaged thereby.

6. A valve comprising:
  a valve housing including an inlet, an outlet and an interior cavity extending between said inlet and said outlet, said cavity opening to the exterior of said housing and having first and second, progressively reduced diameter steps;
  a valve seat within said cavity between said inlet and said outlet and axially movable to engage with said second step;
  a poppet within said cavity on the side of said second step opposite said seat;
  means mounting said poppet for movement toward and away from said valve seat so that said poppet may seat against or be spaced from said valve seat; and a resilient bellows mounting said valve seat within said cavity and axially biasing said seat toward said second step, said bellows having a first end sealed to said valve seat, an opposed end including a mounting ring engaging said first step and sealed to said housing between said first and second steps, and a hollow interior defining a flow path from one of said inlet and said outlet to said valve seat;

whereby said valve seat is resiliently mounted by said bellows to be self-alignable with said poppet.

7. The valve of claim 6 including a cap removably and sealably mounted on said housing to close said cavity and removable to allow said seat, said bellows and said ring to be removed from said cavity as a module.

8. A valve comprising:
a valve housing including an inlet, an outlet and an interior cavity extending between said inlet and said outlet;
a ring-like valve seat movably received within said housing and in said cavity between said inlet and said outlet;
a frusto-conical poppet within said cavity on the outlet side of said seat;
means mounting said poppet for movement toward and away from said valve seat so that said poppet may seat against or be spaced from said valve seat;
a stop within said cavity for limiting movement of said valve seat toward said poppet; and
a resilient bellows on the inlet side of said valve seat and mounting said valve seat within said cavity, said bellows having a first end sealed to said valve seat, an opposed end sealed to said housing and a hollow interior defining a flow path from one of said inlet and said outlet to said valve seat, said bellows further biasing said valve seat toward said stop;
whereby said valve seat is resiliently mounted by said bellows to be shiftable within said cavity to align with said poppet.

* * * * *